United States Patent [19]

Lorch et al.

[11] 4,010,393
[45] * Mar. 1, 1977

[54] DYNAMO-ELECTRIC MACHINES

[75] Inventors: Hugh Olaf Lorch; Albert Benjamin John Reece, both of Stafford, England

[73] Assignee: The English Electric Company, Limited, London, England

[ * ] Notice: The portion of the term of this patent subsequent to Mar. 1, 1994, has been disclaimed.

[22] Filed: Dec. 12, 1974

[21] Appl. No.: 532,047

[30] Foreign Application Priority Data

Jan. 11, 1974 United Kingdom ............... 1357/74

[52] U.S. Cl. ............................... 310/194; 310/43; 310/262

[51] Int. Cl.² ............................................ H02K 1/32

[58] Field of Search ............ 310/194, 52, 183, 179, 310/192, 197, 43, 42, 45, 261, 262, 264, 271, 265; 29/598

[56] References Cited

UNITED STATES PATENTS

| | | | |
|---|---|---|---|
| 2,340,905 | 2/1944 | Sigmund | 310/45 UX |
| 2,432,436 | 12/1947 | Morrill | 310/271 UX |
| 2,750,523 | 6/1956 | Wiedmann | 310/183 |
| 2,896,100 | 7/1959 | Axelson | 310/271 |
| 3,171,999 | 3/1965 | Kemp | 310/45 |
| 3,189,769 | 6/1965 | Willyoung | 310/52 |
| 3,246,187 | 4/1966 | Iemura | 29/598 |
| 3,388,458 | 6/1968 | Logan | 310/43 |
| 3,588,560 | 6/1971 | Akselsen | 310/265 |
| 3,621,315 | 11/1971 | Dalmo | 310/183 |
| 3,683,220 | 8/1972 | Konovalov | 310/183 |
| 3,814,959 | 6/1974 | Lehuen | 310/61 |

*Primary Examiner*—R. Skudy
*Attorney, Agent, or Firm*—Kirschstein, Kirschstein, Ottinger & Frank

[57] ABSTRACT

A rotor of a dynamo-electric machine having the conductors of the rotor winding constrained against the effects of centrifugal force by a plurality of annular members which encircle the conductors at spaced positions along the body of the rotor and are prestressed to clamp the conductors to the rotor so that no further stretching of the annular members occurs at the maximum speed of the rotor. Preferably the annular members are prestressed in situ on the rotor by expansible devices interposed between the annular members and the conductors of the rotor winding. One form of expansible device comprises an inflatable bag into which is pumped synthetic resin under pressure, the resin being cured so that it becomes solid while in the pressurized condition.

11 Claims, 9 Drawing Figures

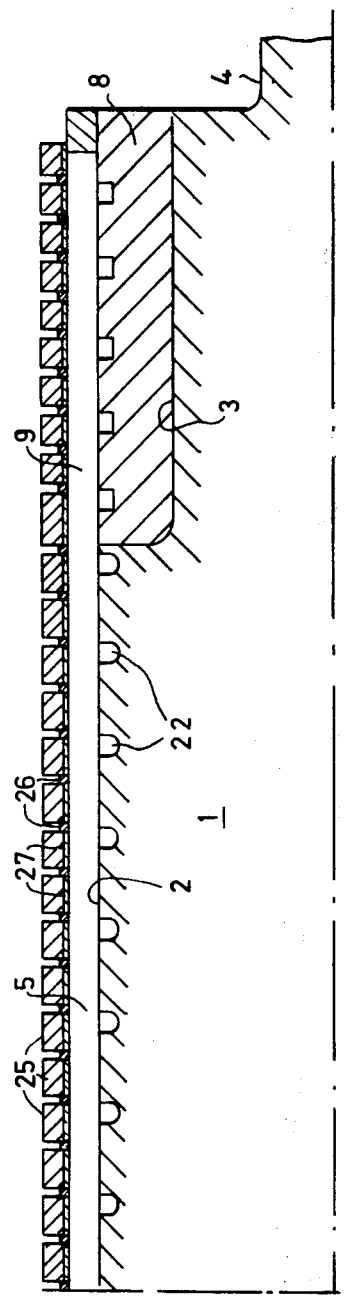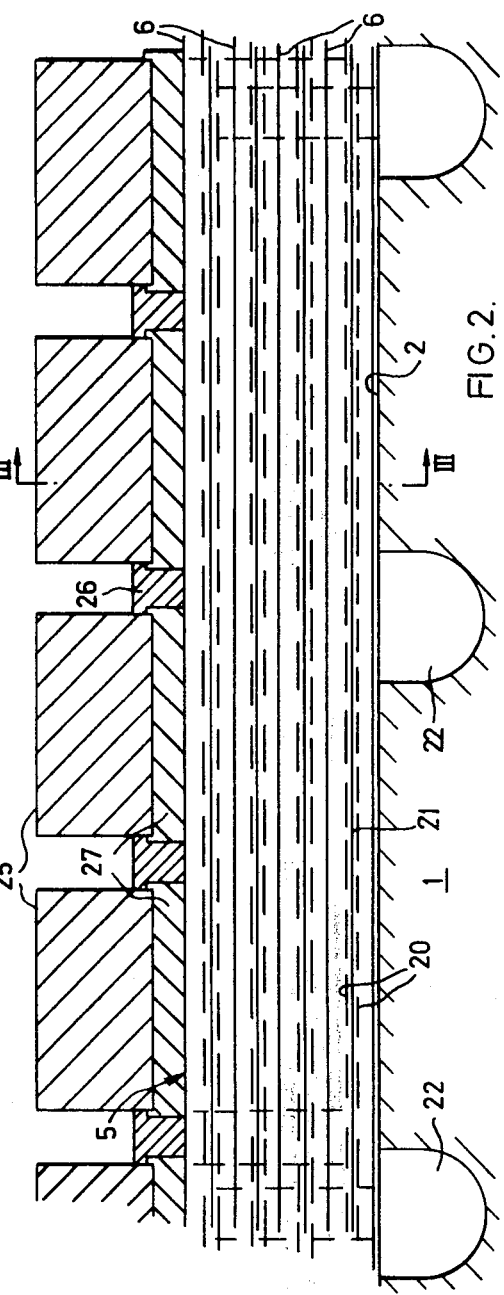

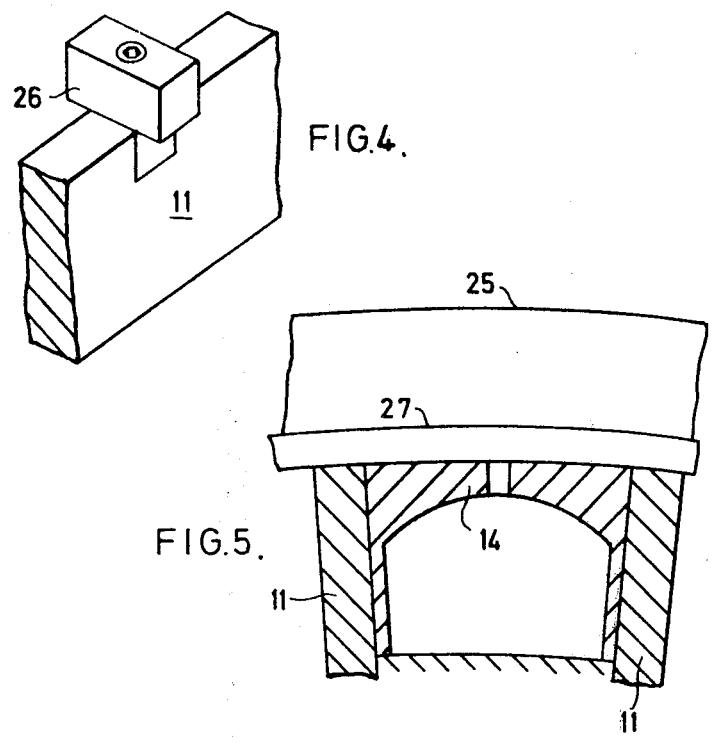
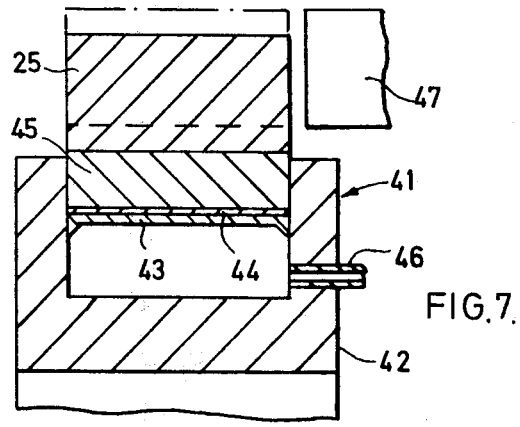

DYNAMO-ELECTRIC MACHINES

This invention relates to rotor windings of dynamo-electric machines and has an important application to rotor windings for "slot-less" rotors, that is to say, rotors in which the main part of the magnetic flux is conducted into the rotor body without passing through integral magnetic teeth as in conventional rotors.

In both slot-less and conventional rotors the severe centrifugal forces which act on the conductors of the rotor winding during use can cause undesirable radial movement of these conductors.

It is an object of this invention to provide a rotor in which the conductors of the rotor winding are restrained against such undesirable radial movement.

According to the present invention a rotor of a dynamo-electric machine has the conductors of the rotor winding constrained against the effects of centrifugal force by a plurality of annular members which encircle said conductors at spaced positions along the body of the rotor and are prestressed to clamp the conductors to the body of the rotor, so that no further stretching of the annular members occurs at the maximum speed of the rotor.

Preferably the annular members are prestressed in situ on the rotor, and to this end at least one expansible device may be interposed between the annular members and the conductors of the rotor winding and then expanded to prestress the annular members.

One form of expansible device comprises an inflatable container into which is forced a fluid medium under pressure. For example, the fluid medium may be a suitable synthetic resin which can be pumped into the inflatable container under pressure and which can be cured so that it becomes solid while in the pressurized condition.

Alternatively, the annular members may be prestressed before being fitted to the rotor and then forced over the conductors of the rotor winding while in the prestressed condition.

Conveniently, the annular members may be prestressed by a hydraulically operated device and then forced into position over the conductors by a hydraulically operated ram.

According to another aspect of the invention a slot-less rotor of a dynamo-electric machine has the axially extending conductors of the rotor winding constrained against torque forces by a plurality of support members disposed axially along the active region of the rotor body and projecting from the periphery of the rotor body so that groups of axially extending conductors lie between two adjacent support members.

The support members may be formed from a suitable metal such as steel or phosphor bronze or may be formed from a suitable electrically insulating material.

When the support members are of metal they may be connected together to form a damper winding.

The support members may be suitably tapered and extend radially from the periphery of the rotor body, and the surface of the rotor body between two adjacent support members may be flat, so that the axially extending conductors can be of uniform substantially rectangular cross-section.

The invention will now be described, by way of example, with reference to the accompanying drawings in which:

FIG. 1 is a longitudinal sectional elevation of part of a gas-cooled slot-less rotor in accordance with the invention;

FIG. 2 is a fragmentary longitudinal sectional elevation of an active region of the rotor shown in FIG. 1, but drawn to a larger scale than that figure;

FIG. 4 is a fragmentary perspective view showing one of the stop members shown in section in FIG. 2;

FIG. 5 is a fragmentary sectional elevation showing a supporting arch which replaces conductors near the direct axis of the rotor;

FIG. 7 is a sectional elevation of a hydraulically operated jacking device which can be used to fit the annular members to the rotor winding;

Figure 3:
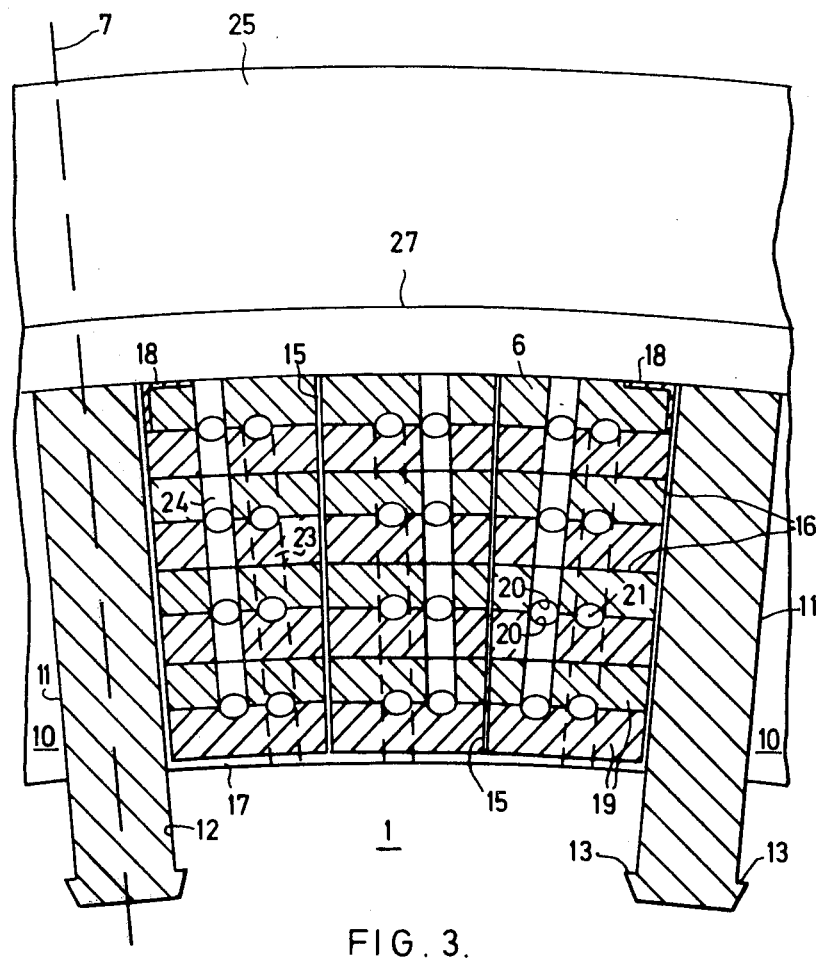
FIG. 3 is a section taken on the line III—III in FIG. 2 and looking in the direction of the arrows.

Referring in the first instance to FIGS. 1 to 7, the slot-less gas-cooled rotor comprises a cylindrical rotor body 1 having an active region 2 which lies within the stator (not shown) of a dynamo-electric machine, and has at each end, an overhang region 3 which has a diameter less than that of the active region 2 and terminates in a shaft 4. Conveniently, the rotor body 1 may be formed by a one-piece steel forging. A winding 5, comprising a multiplicity of conductors 6, which extend axially along the periphery of the active region 2, occupies substantially one third of the periphery of the rotor body at each end of the quadrature axis 7.

Two annular members 8, each having an outer diameter substantially equal to that of the active region 2 are shrunk onto, and keyed to, respective overhang regions 3 of the rotor body 1 to form supports for end windings 9 in the manner described in our co-pending U.S. application Ser. No. 532,048 filed Dec. 12, 1974.

Each member 8 is of non-magnetic material of low density and may conveniently comprise a foregoing of aluminum alloy.

The annular space surrounding the periphery of the active region 2 is separated into 36 equal portions or blocks 10 by 36 support members or fence 11 (see FIG. 3) which are disposed axially along the active region 2 and which project radially from the periphery of the active region 2. The radially inner ends of the fences 11 fit within grooves 12 extending axially along the active region 2. The fences 11, which may be of steel, phosphor bronze or a suitable insulating material, are held against centrifugal force by ledges 13 which co-operate with correspondingly shaped portions of the grooves 12. The conductors 6 forming the winding 5 occupy twelve adjacent blocks 10 at each end of the quadrature axis 7 leaving six blocks 10 at each side which are occupied by supporting arches 14 (see FIG. 5) of electrically conductive material such as copper. In one arrangement of conductors 6 shown in FIG. 3, each block 10 contains twelve conductors 6 in all, disposed in three vertical stacks of four conductors each. The three vertical stacks of conductors are electrically insulated from each other by sheets 15 of insulating material interposed between the stacks, and the conductors 6 in a vertical stack are electrically insulated from one another by the strips 16 of insulating material interposed between the conductors. The fences 11 and the rotor body 1 are electrically insulated from the conductors 6 in the block 10 by a U-shaped channel 17 of insulating material and by creep barriers 18 of insulating material.

Each conductor 6 is built up from two copper straps 19 each having two grooves 20 of semi-elliptical cross-section, the two straps 19 being stuck together so that the grooves 20 coincide to form ducts 21 of elliptical cross-section for conveying a gas coolant through the winding 5.

Gas coolant, preferably hydrogen at a pressure of about 60 p.s.i., is pumped by fans (not shown) mounted at each end of the rotor shaft 4 so that the rotor body 1 is cooled symmetrically from each end. The main flow is along channels (not showing) extending axially along the annular support members 8 and through the arches 14 (see FIG. 5) near the direct axis. The gas coolant then flows peripherally ind ducts 22 in the rotor body 1 to the ducts 21 in the conductors 6. Holes 23 which extend radially through the seven radially inner straps 19 admit cooling gas to the ducts 21 and holes 24 which extend radially through the seven radially outer straps 19 convey cooling gas from the ducts 21. The entry hole 23 to say the right hand set of ducts 21 in a stack in FIG. 3 is positioned along the straps 19 about midway between the entry hole 23 to the left hand set of ducts 21 and the corresponding exit hole 24. Thus the gas flowing in any one duct 21 in a conductor 6 passes, halfway along its path, the short length of conductor between one exit hole 24 and the next entry hole 23, which is not cooled by the other duct 21 in that conductor.

The conductors 6 forming the winding 5 are constrained against the effects of centrifugal force by a plurality of annular members 25 which are prestressed to clamp the conductors 6 to the rotor body 1 so that no further stretching of the annular members 25 occurs at the maximum speed attained during overspeed testing of the rotor. The annular members 25, which are formed from strong fibres embedded in synthetic resin constrain the conductors 6 so that they can withstand the severe centrifugal forces which are set up when the rotor is running at maximum speed and which may amount to 10,000 times the weight at rest of the winding 5. The annular members 25 are restrained against axial movement by T-shaped stop members 26 (see FIG. 4) which are secured in notches cut in the fences 11 in the spaces between the annular members 25.

The radially inner surfaces of the annular members 25 or the radially outer surfaces of the winding 5 may be coated with a slippery substance, such as polytetrafluoroethylene or molybdenum disulphide, to permit movement of the conductors 6 in an axial direction caused by thermal expansion during use.

Preferably the annular members 25 are prestressed in situ on the winding 5 by inflatable bags 27 which are interposed between the annular members and the conductors 6 forming the winding 5. The inflatable bags 27 are provided with connectors 28 (see FIG. 6) through which a suitable fluid medium, such as synthetic resin, is injected into the bags 27 under pressure to prestress the annular members 25. The connectors 28 are housed in blocks 29 which are inserted in the spaces between two adjacent annular members 25 in place of two adjacent stop members 26. The synthetic resin is then cured while under pressure to maintain the annular members 25 in a prestressed condition. Typically, the resin is injected at a pressure within the range 5,000 to 15,000 p.s.i. and is cured by heating to a high temperature. After the resin has been cured the blocks 29 are removed and stop members 26 secured in their places.

Conveniently, the inflatable bags 27 comprise uniform tubes which are wider than the annular members 25 and which initially are bent outwards as shown in full line at positions 30 and 31, around the inner edges of the annular members 25. As the annular members 25 expand to the stretched positions during the injection of the resin the inflatable bags 27 unroll to the configuration shown in broken lines 32 without any rubbing action. The edges of the inflatable bags 27 are held close to the annular members 25 by the blocks 29 of densified plywood which temporarily replace the stops 26 and are secured by bolts (not shown) screwed into the fences 11. Advantageously, the surfaces of the blocks 29 in contact with the inflatable bags 27 may be coated with a substance having a low coefficient of friction, such as polytetrafluoroethylene, to allow the blocks 29 to be withdrawn easily after the resin has set.

A connector 28, through which the resin is injected, is attached to an inflatable bag 27 at a position reinforced locally by a rubber washer 33, by means of a flanged tube 34 inserted into the inflatable bag 27. The rubber washer 33 is initially compressed to form a seal by pressing the flanged tube 34 into the connector 28 until it is retained by a cylindrical spring 35 in a space 36. A tube 37 through which the resin is injected is attached to the connector 28 by a nut 38 accommodated in a cavity 39 in the block 29. Preferably, all the bags 27 are inflated simultaneously, and after the resin has set the blocks 29 are removed and the connector 28 sheared off at a notch 40.

Alternatively, as shown in FIG. 7, the annular members 25 can be prestressed with a hydraulically operated jacking device 41 comprising strong steel annulus 42 fitted with a flexible oil seal 43 which is surrounded by a thin walled cylinder 44 of glass-resin composite material and a ring of discrete steel blocks 45. To prestress an annular member 25 it is placed over the ring of blocks 45, and oil at a high pressure is pumped through an inlet tube 46 into the annulus 42 until the annular member 25 is stretched enough to provide the required prestressing. The annular member 25 is then forced into position over the rotor winding 5 by a hydraulically operated ram 47. The radially inner surface of the annular member 25 or the radially outer surface of the winding 5 may be coated with a slippery substance, such as polytetrafluoroethylene or molybdenum disulphide, to reduce the force necessary to ram the annular member 25 into position on the winding, and to reduce the stress in the winding and stop members 26 when the conductors 6 expand axially due to heating.

Figure 8:
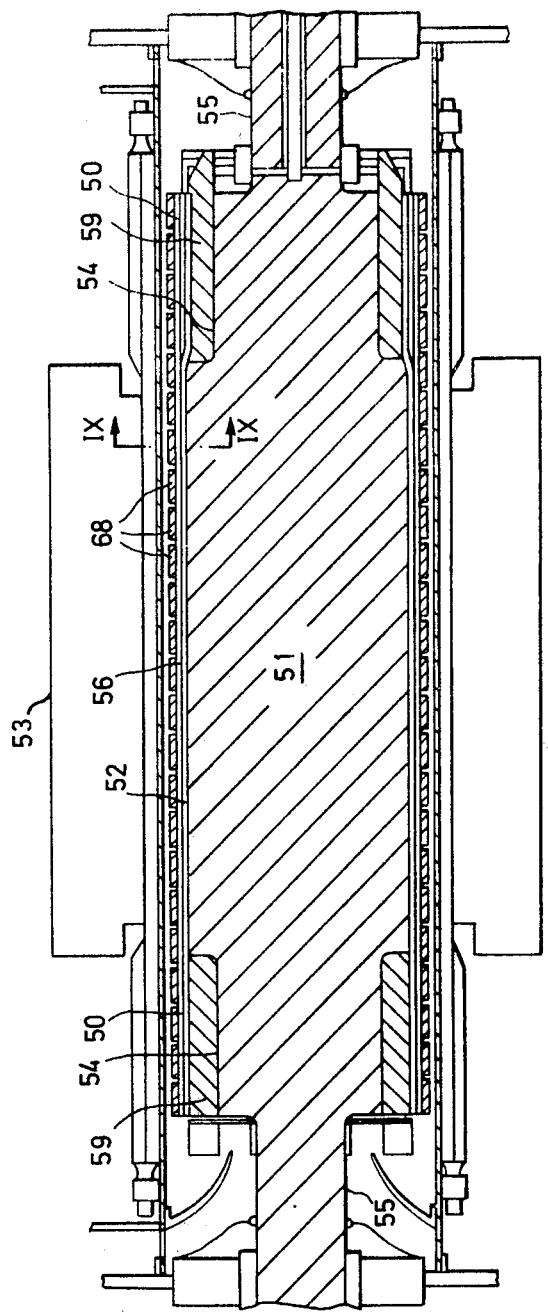
FIG. 8 is a sectional elevation of a water-cooled slot-less rotor in accordance with the invention.
Figure 9:
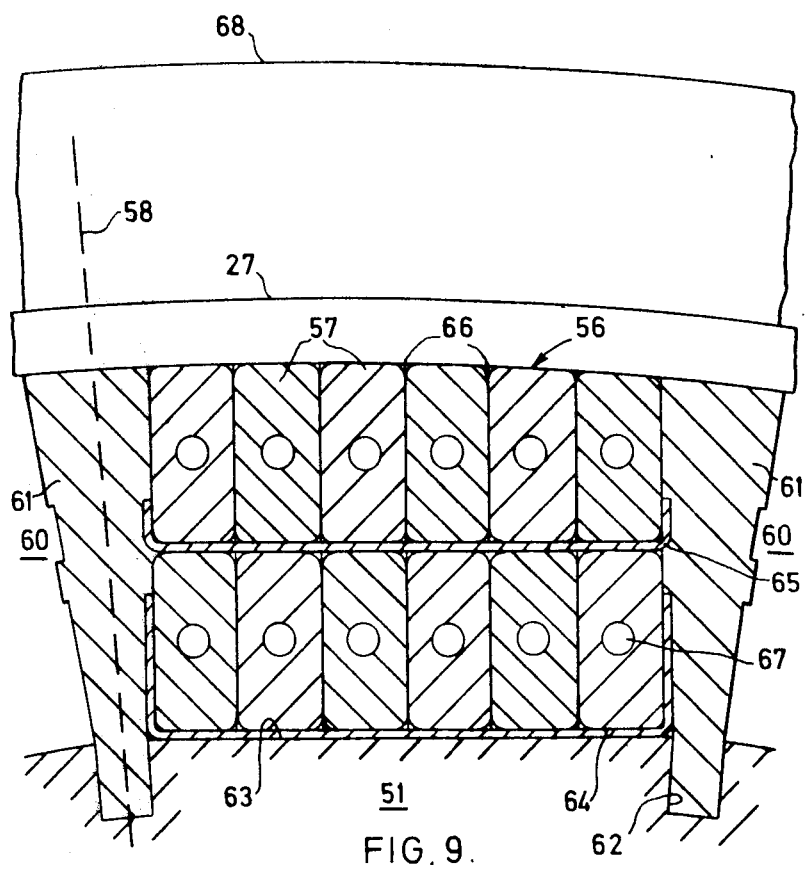
FIG. 9 is a fragmentary section on the line IX—IX in FIG. 8 but drawn to a larger scale than that FIG.

Referring now to FIGS. 8 and 9, the slot-less water-cooled rotor comprises a cylindrically rotor body 51 having an active region 52 which lies within a stator 53, and has at each end, an overhang region 54 which is of smaller diameter than the active region 52 and terminates in a shaft 55. Conveniently, the rotor body 51 may be formed by a one-piece steel forging. A winding 56 comprising a multiplicity of conductors 57 (see FIG. 9) which extend axially along the periphery of the active region 52, occupies substantially one third of the periphery of the rotor body 51 at each end of the quadrature axis 58. Two annular support members 59, each having an outer diameter slightly less than that of the active region 52, are shrunk onto and keyed to, respective overhang regions 54 of the rotor body 51 to form supports for end windings 50 in the manner described in our aforesaid United States patent application. Each annular support member 59 is of non-magnetic material of low density and may conveniently comprise a forging of aluminium alloy.

The annular space surrounding the periphery of the active region 52 is separated into thirty-six equal portions or blocks 60 (see FIG. 9) by 36 axially extending support members or fences 61 of tapered cross-section which project radially from the periphery of the active region and fit within grooves 62 extending axially along the active region 52. The fences 61 are of electrically insulating material. The axially extending conductors 57 forming the winding 56 occupy twelve adjacent blocks 60 at each end of the quadrature axis 58, the surface 63 of the rotor body 51 at the bottom of each block 60 being machined substantially flat so that conductors 57 of substantially rectangular cross-section may be used, and the taper on the fences 61 being arranged so that the conductors 57 are of uniform cross-section.

In one arrangement of conductors 57 shown in FIG. 9, each block 60 contains twelve conductors 57 formed by copper tubes of substantially rectangular cross-section disposed in two horizontal rows. The lower row of conductors 57 is electrically insulated from the rotor body 51 by a U-shaped channel 64 of electrically insulating material and the upper row of conductors is electrically insulated from the lower row by a U-shaped channel 65 of electrically insulating material, the conductors in each row being insulated from each other by sheets 66 of insulating material. The six remaining blocks at each end of the direct axis contain similar conductors formed by copper tubes of rectangular cross-section which are connected together to form a damper winding (not shown). Six such conductors are arranged in each such block and are disposed in a single radially outer row, the radially inner part of the block being filled with a suitable packing material. A cooling liquid, for example water, is circulated through the internal passages 67 of the conductors 57.

Figure 6:
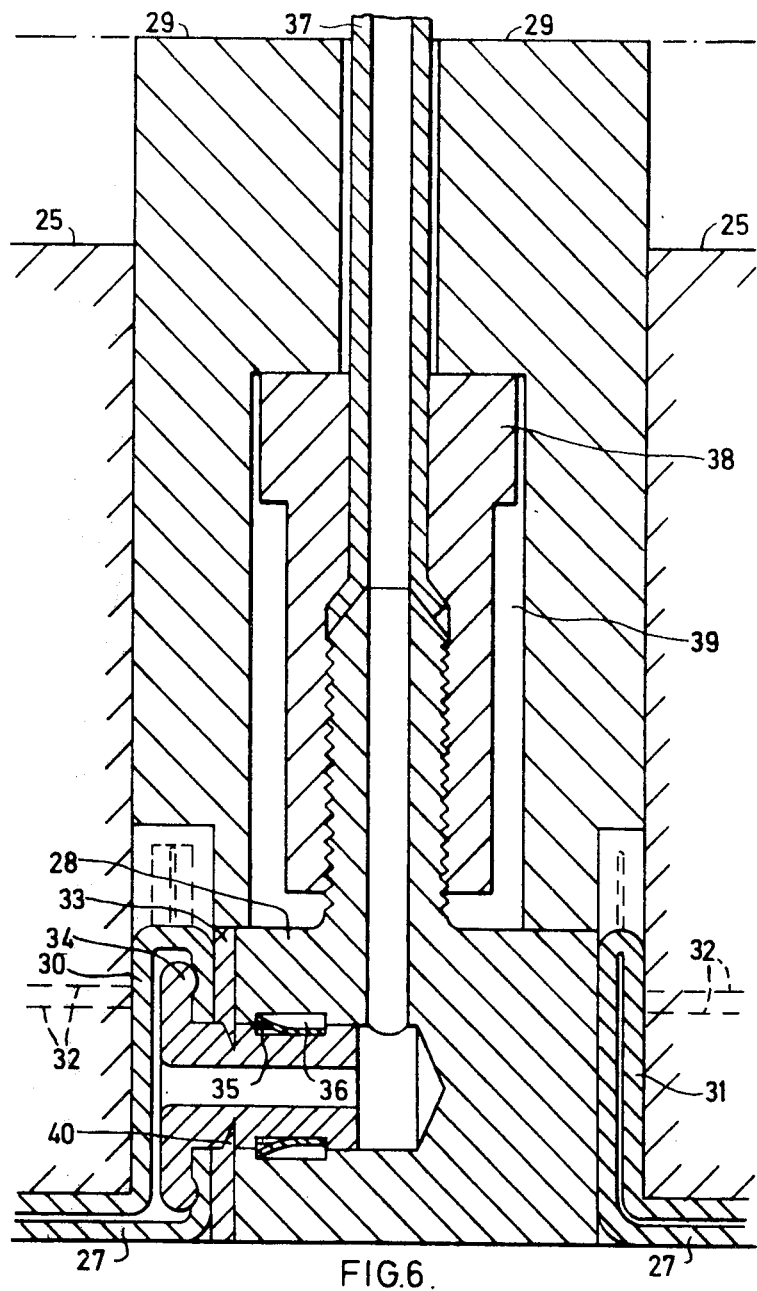
FIG. 6 is a fragmentary sectional elevation showing a connector for filling inflatable bags which prestress the annular members.

The conductors 57 forming the winding 56 are constrained against the effects of centrifugal force by a plurality of annular members 68 which are prestressed to clamp the conductors 57 to the rotor body 51 so that no further stretching of the annular members 68 occurs at the maximum speed attained during overspeed testing of the rotor. The annular members 68, which are formed by strong fibres embedded in synthetic resin, constrain the conductors 57 so that they can withstand the severe centrifugal forces which are set up when the rotor is running at maximum speed. Preferably the annular members 68 are prestressed in situ on the winding 56, using inflatable bags 27 as shown in FIG. 6 in the manner previously described.

Whilst in the gas-cooled rotor it may be desirable to apply to the radially inner surfaces of the annular members or the radially outer surfaces of the winding a coating of a slippery substance, with the smaller temperature changes which occur in a water-cooled rotor the application of such a coating is not necessary. Moreover, under the intense pressure of the annular members 68, friction prevents axial movement of the conductors relative to the rotor body 51 and stop members between the annular members 68 are not essential. Alternatively the annular members may be prestressed using the hydraulically operated jacking device 41 shown in FIG. 7 in the manner previously described.

Although the embodiments of the invention described above are slot-less rotors it will readily be appreciated that the invention is also applicable to conventional rotors.

We claim:
1. A dynamo-electric machine rotor comprising:
 a. a rotor body;
 b. a winding on the rotor body including a multiplicity of conductors extending axially along the length of the rotor body;
 c. a plurality of annular members encircling said conductors at respective positions axially spaced along the rotor body to constrain the conductors against the effects of centrifugal force; and
 d. at least one expansible device interposed between the annular members and the conductors of the rotor winding, the expansible device being held in an expanded condition to prestress the annular members to a tensioned condition to clamp the conductors to the rotor body, and to an extent such that stretching of the annular members at the maximum speed of the rotor is substantially prevented.

2. A rotor as claimed in claim 1, wherein said expansible device comprises an inflatable container containing a medium which maintains the container in the inflated condition.

3. A rotor as claimed in claim 2, wherein the medium within the inflatable container is a solidified curable synthetic resin.

4. A rotor as claimed in claim 1, wherein the annular members are formed from strong fibers embedded in synthetic resin.

5. A rotor as claimed in claim 1, wherein the rotor is a slot-less rotor and the axially extending conductors of the rotor winding are constrained against torque forces by a plurality of support members disposed axially along an active region of the rotor body and projecting from the periphery of the rotor body so that groups of axially extending conductors lie between two adjacent support members.

6. A rotor as claimed in claim 5, wherein the radially inner ends of support members are located in grooves extending axially along the rotor body.

7. A rotor as claimed in claim 5, wherein the support members are of steel.

8. A rotor as claimed in claim 5, wherein the support members are of phosphor bronze.

9. A rotor as claimed in claim 5, wherein the support members are of electrically insulating material.

10. A rotor as claimed in claim 5, wherein the part of the surface of the rotor body between two adjacent support members is substantially flat, the adjacent surfaces of said two support members are parallel to each other and perpendicular to the flat surface of the rotor body, and the axially extending conductors are of substantially rectangular cross-section.

11. A rotor as claimed in claim 1, wherein the annular members are restrained against axial movement by stop members which are secured to the support members.

* * * * *